United States Patent
Tarnanen

[19]

[11] Patent Number: 6,085,100
[45] Date of Patent: Jul. 4, 2000

[54] ROUTING A SHORT MESSAGE REPLY

[75] Inventor: Teemu Tarnanen, Espoo, Finland

[73] Assignee: Nokia Telecommunications Oy, Finland

[21] Appl. No.: 09/125,752

[22] PCT Filed: Jan. 2, 1998

[86] PCT No.: PCT/FI98/00006

§ 371 Date: Aug. 25, 1998

§ 102(e) Date: Aug. 25, 1998

[87] PCT Pub. No.: WO98/30051

PCT Pub. Date: Jul. 9, 1998

[30] Foreign Application Priority Data

Jan. 3, 1997 [FI] Finland ..................................... 970037

[51] Int. Cl.[7] ........................................ H04Q 7/20
[52] U.S. Cl. ...................... 455/466; 455/445; 340/825.44
[58] Field of Search ..................................... 455/466, 412, 455/414, 415, 445; 340/825.44

[56] References Cited

U.S. PATENT DOCUMENTS

| | | | |
|---|---|---|---|
| 5,577,102 | 11/1996 | Koivunen .................................. | 455/466 |
| 5,678,179 | 10/1997 | Turcotte et al. ..................... | 340/825.44 |
| 5,706,211 | 1/1998 | Beletic et al. ...................... | 340/825.44 |
| 5,787,357 | 7/1998 | Salin ........................................ | 455/466 |
| 5,794,142 | 8/1998 | Vanttila et al. .......................... | 455/466 |
| 5,878,347 | 3/1999 | Joensuu et al. .......................... | 455/445 |
| 5,878,397 | 3/1999 | Stille et al. .............................. | 455/446 |
| 5,915,222 | 6/1999 | Olsson et al. ............................ | 455/466 |
| 5,920,826 | 11/1996 | Metso et al. ............................. | 455/466 |

FOREIGN PATENT DOCUMENTS

| | | |
|---|---|---|
| 0 699 009 | 2/1996 | European Pat. Off. . |
| WO 92/14329 | 8/1992 | WIPO . |
| WO 93/26131 | 12/1993 | WIPO . |
| WO 96/03843 | 2/1996 | WIPO . |
| WO 96/06508 | 2/1996 | WIPO . |
| WO 96/26616 | 8/1996 | WIPO . |
| WO 97/08906 | 3/1997 | WIPO . |
| WO 97/14262 | 4/1997 | WIPO . |
| WO 97/20442 | 6/1997 | WIPO . |
| WO 97/36437 | 10/1997 | WIPO . |

OTHER PUBLICATIONS

*European Telecommunication Standard*, "European digital cellular telecommunications system (Phase 2); Technical realization of the Short Message Service (SMS) Point to Point (PP)", GMS 03.40.

Mouly and Pautet, *The GSM System for Mobile Communications*.

International Search Report for PCT/FI98/00006.

*Primary Examiner*—Dwayne D. Bost
*Assistant Examiner*—Quochien B. Vuong
*Attorney, Agent, or Firm*—Altera Law Group LLC

[57] ABSTRACT

The invention relates to a digital mobile system and a method for routing a short message via a short message gateway application in a digital mobile system. The invention discloses an arrangement which provides a subscriber with a transparent routine for answering to short messages. A short message reply is routed to the original source address in a gateway application connected to the system by means of a dynamic database by utilizing an identifier identifying the short message reply, formed in the gateway application.

4 Claims, 4 Drawing Sheets

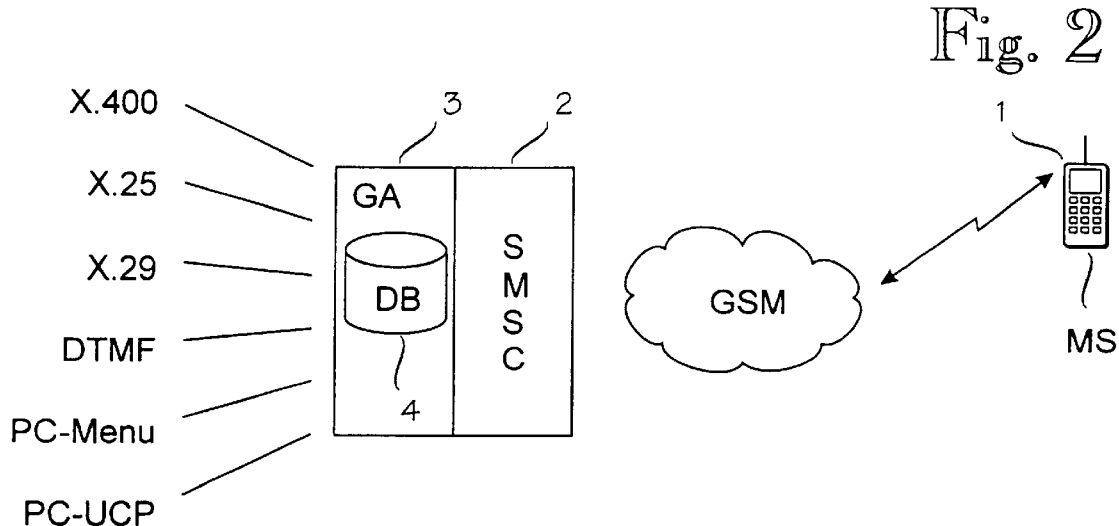
Fig. 2
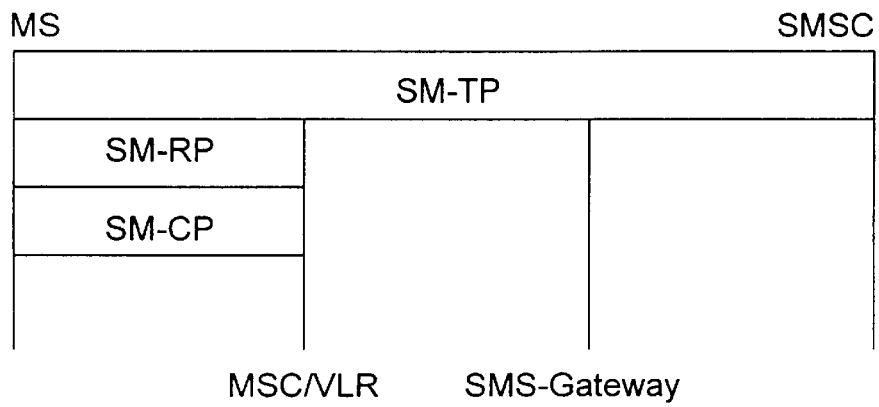
Fig. 3
Fig. 4
Routing table record
| daddr | oaddr = scts | originating telematic service address |
|---|---|---|

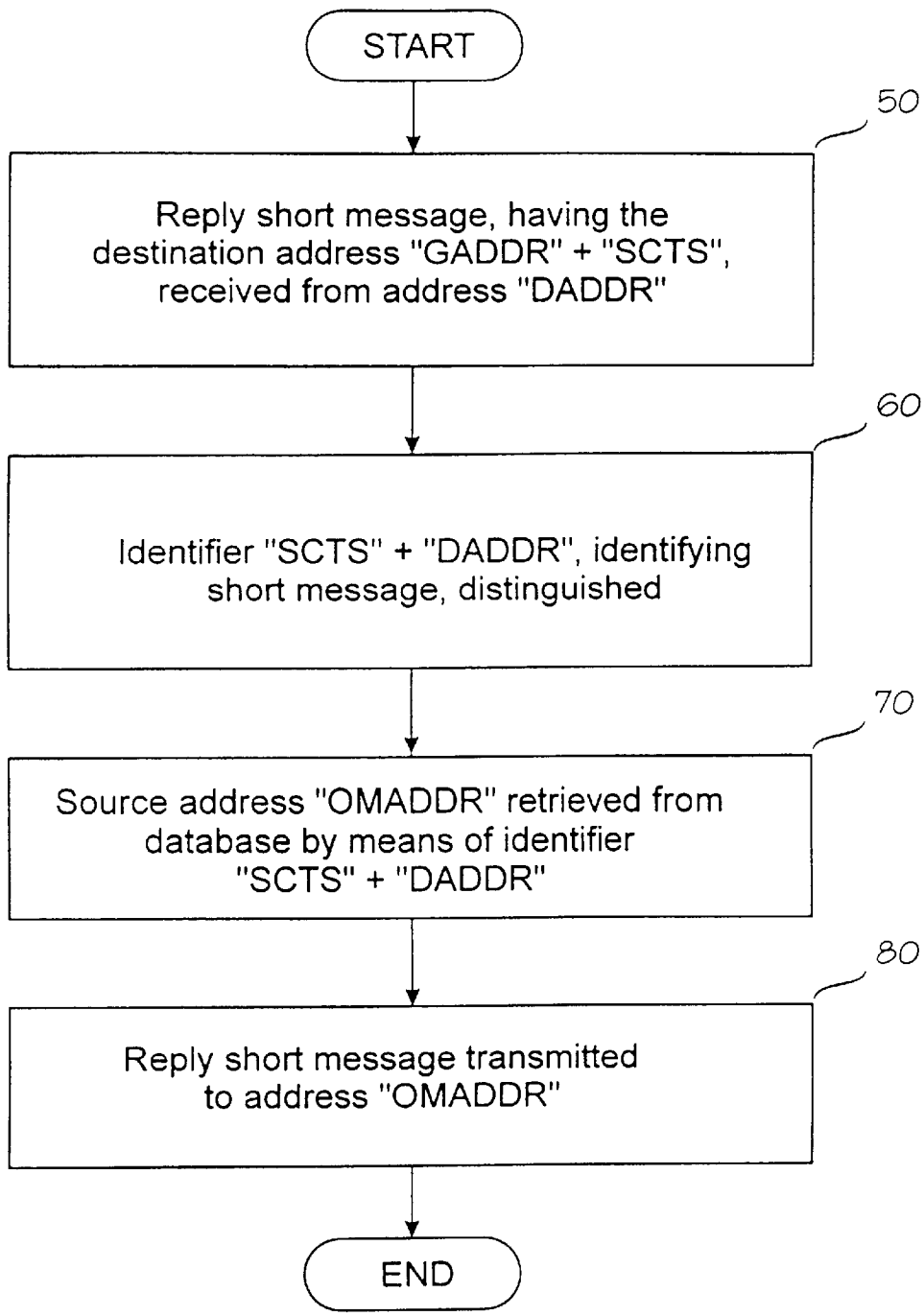

ROUTING A SHORT MESSAGE REPLY

FIELD OF THE INVENTION

The invention relates to mobile systems and particularly to a method for routing a short message via a short message gateway application in a digital mobile system, the method comprising the steps of receiving, in a short message gateway application, a data message containing the original source address and destination address, converting the data message into a short message, transmitting the short message to a terminal equipment determined in the destination address via the mobile system.

BACKGROUND OF THE INVENTION

In digital mobile systems it is possible to transmit, in addition to normal speech and data connections set up on traffic channels, short digital data messages or short messages that are sent on control and signalling channels of a system between the actual signalling. Mobile systems are generally provided with a short message service centre that enables transmission of short messages between the elements wishing to send and receive short messages via the mobile network. In case of a short message originating from a terminal equipment, a subscriber forms a short message with the keyboard of the terminal equipment and the terminal equipment transmits the short message on the signalling channel via the base station and the mobile services switching centre to the short message service centre. The short message service centre forwards the short message to another network or to a terminal equipment of another subscriber via the mobile network on signalling channels.

The use of short messages has become far more common and new applications are defined continuously. In addition to messages received from terminal equipments, a short message service centre may also receive messages in an electronic form from IP, X.25 and X.400 networks, for example. Some operators also provide services where a short message can be delivered to the short message service centre by facsimile or it can be dictated in the form of a voice message so that the operator converts the message into a short message form. For processing messages arriving from different sources, a short message service centre is provided with an associated gateway application or gateway applications by means of which a message is converted into a short message form to be transmitted via the mobile system.

A subscriber terminal equipment may receive short messages from more than one short message service centre. A terminal equipment usually stores as a default value a short message service centre to which a short message originating from the terminal equipment is directed. GSM specification 03.40 (Appendix 4) defines a reply path comprising the reply routine used in connection with short messages. The reply path enables a reply transmitted by a subscriber to be routed to the mobile station that transmitted the original message, via the short message service centre via which the message was originally delivered to the subscriber, instead of the short message service centre stored in the replying terminal equipment as a default value. By means of the routine the subscriber may reply to a short message without having to know the network address of the mobile station or the short message service centre that originally transmitted the message.

When a message delivered to a subscriber originates from a source situated outside the area of the short message service centre, the routing of the reply message to the original source by means of the reply path is not possible, however. The reply path returns the reply to the short message service centre that transmitted the message, but the short message service centre comprises no information required to route the message to an external network. In order to be able to reply to a message that arrives from an external network, the mobile subscriber must know itself the required routing data. This makes the use of messages complicated and, in practice, subscribers cannot be expected to have such information.

One possibility of routing messages originating from a terminal equipment to an external network is a database that is added to the short message service centre and that permanently stores a list of extra file names or private numbers that refer to the network addresses provided by the subscriber. However, this system is rather difficult and it increases the amount of data stored in the short message service centre, especially since the specifications must be stored in each short message service centre. The data must also be stored in the database before the transmission of a reply, and therefore the database is of no help in answering to a message arriving from a new source.

BRIEF DESCRIPTION OF THE INVENTION

The purpose of the present invention is to provide an arrangement by means of which a subscriber is provided with a transparent routine for answering to short messages. A short message is routed to its original source address by means of a dynamic database connected to the system and therefore it is not necessary to permanently store the information related to the routing in short message service centres or in associated gateway applications.

This is achieved with a method according to the invention, characterized in that the method also comprises the steps of forming an identifier identifying the short message, forming a temporary source address of the short message by combining the address of the gateway application and the identifier identifying the short message or a part of it, storing, in the gateway application, the routing data of the short message containing the original source address of the data message and said identifier identifying the short message, receiving from the mobile station a reply short message containing said identifier identifying the short message, retrieving from the routing data the original source address on the basis of said identifier identifying the short message, transmitting a reply message to said original source address.

The invention also relates to a digital mobile system comprising terminal equipments signalling with the system on predetermined signalling channels, at least one short message service centre with which the terminal equipments can exchange short messages, and at least one short message gateway application connected to at least one short message service centre for converting the data messages arriving at the short message service centre into the short message form. The system is characterized in that the gateway application forms the temporary source address of the short message by combining the identifier identifying the short message or a part of it to the address of the gateway application, the gateway application stores the routing data of the short message, the routing data comprising the original source address of the message and the identifier identifying the short message, in response to the reception of the reply message, the gateway application retrieves from the routing data the original source address of the message by means of the identifier used for identifying the short message, the gateway application transmits the reply message to said original source address of the message.

The invention is based on the idea that a gateway application processing data messages arriving from the outside is provided with a database for the routing data of short messages. During the formation of a short message, the gateway application creates in the database a record comprising the network address of the party that originally transmitted the message and an identifier by means of which the short message is identified. When a subscriber replies to the short message by means of the reply path, the reply message is routed back to the gateway application. The gateway application carries out a search in the database by means of the identifier and routes the message to an external network or to some other destination on the basis of the original network address retrieved from the database.

This arrangement has the advantage that it is not necessary to add to the short message service centre permanent databases for routing short messages, but the routing can be carried out by means of one dynamic database. A subscriber answering to a short message does not need information about the short message service centre that transmitted the message nor about the network address of the transmitter, but the facility is quite transparent to the subscriber. The invention essentially improves the processing of short messages in cellular network systems.

LIST OF FIGURES

In the following, the invention will be described in greater detail with reference to the accompanying drawings, in which FIG. 1 is a block diagram illustrating basic structural elements of a GSM system, FIG. 2 is a block diagram illustrating an arrangement for delivering to a mobile station a data message transmitted from an external source to a short message service centre, FIG. 3 shows protocol architecture according to the GSM specification, used for transmitting short messages, FIG. 4 shows an example of a record structure in a database according to the invention, FIG. 5 is a flow chart illustrating the operation of a gateway application connected to a short message service centre during transmission of a mobile terminating short message, and FIG. 6 is a flow chart illustrating the operation of a gateway application connected to a short message service centre during transmission of a mobile originating short message.

DETAILED DESCRIPTION OF THE INVENTION

The invention will be described below by using as an example the short message service of a GSM (Global System for Mobile Communications) mobile system, but the invention can also be applied in other radio systems using a similar message service, such as DCS1800 (Digital Communication System) and PCN (Personal Communication Network), TETRA (TErrestial Trunked RAdio) and in mobile systems according to the EIA/TIA INTERIM standard.

Figure 1:
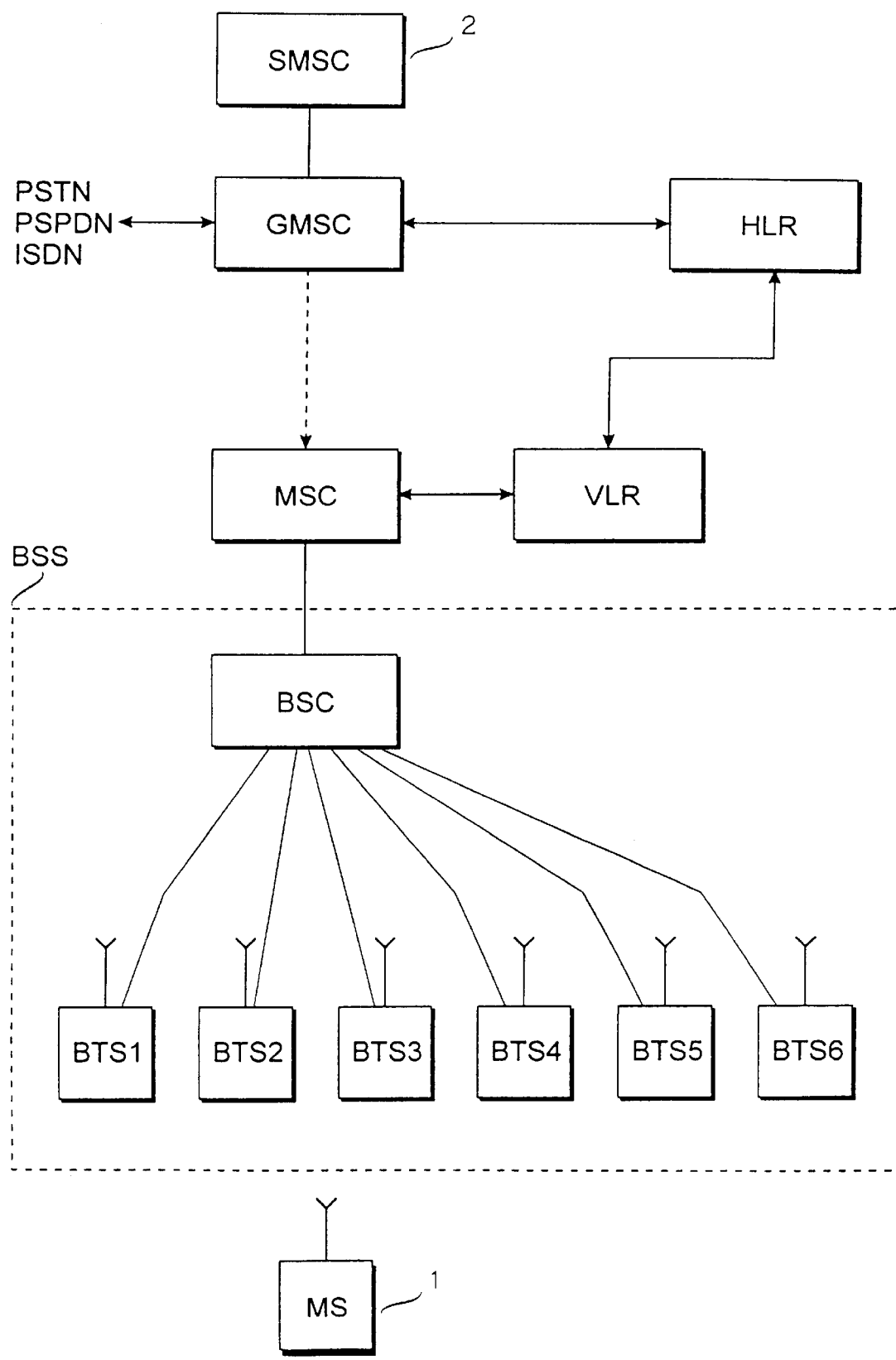

FIG. 1 shortly describes the basic elements of the GSM system, without discussing in greater detail their properties or other parts of the system. For a more detailed description of the GSM system, reference is made to the GSM recommendations and *The GSM System for Mobile Communications* by M. Mouly and M. Pautet, Palaiseau, France, 1992, ISBN:2-9507190-0-0-7.

GMSC illustrates a Gateway Mobile Services Switching Centre, in this figure also comprising the functions of an SMS-GMSC transmitting short messages to a mobile subscriber and an SMS-IWMSC transmitting short messages from a mobile subscriber. A mobile services switching centre MSC manages the switching of incoming and outgoing calls. It carries out similar tasks as an exchange of a public switched telephone network (PSTN). In addition, it also carries out functions that are only characteristic of mobile communications, such as subscriber location management, in co-operation with the network subscriber registers. The GSM system comprises two kinds of subscriber registers: a home location register HLR and a visitor location register VLR. The HLR permanently stores subscriber data, as well as information about the VLR in the area of which a mobile station MS 1 is located. The VLR in turn stores the subscriber data of the MS 1 temporarily while the mobile station is in the area of the MSC connected to the VLR. One VLR typically services one MSC. The MSs 1 are connected to the MSC via base station systems BSS. A BSS consists of base station controllers BSC and base stations BTS. One BSC controls several base stations BTS.

Each BTS uses one or several pairs of carrier waves with which it can set up a duplex connection to an MS 1 moving in its area. Each carrier wave is divided into several, usually eight, TDMA time slots or channels. These channels of the GSM system can be divided into two classes: traffic channels (TCH) and control or signalling channels (CCH).

Traffic channels are used for transmitting either speech or data and a traffic channel is allocated for only one call at a time. Signalling required to control the system is carried out on control or signalling channels. Between a BTS, a BSC and an MSC there are fixed signalling and traffic channels.

There are several types of control channels. A broadcast control channel (BCCH) is a simplex channel from a BTS to an MS 1 and it is used to transmit, to a remote radio station, cell-specific data about the power levels used, the BCCH frequencies of the neighbouring cells, and so on. A BCCH also comprises synchronization and equalization data by means of which a remote radio station locks onto the system.

After the locking the MS 1 listens to the calls of the BTS on a common control channel (CCCH) used solely for setting up a signalling connection. A connection is set up in several stages: 1) transmission of a call from the BTS to the MS 1, 2) transmission of random access, generated by the MS 1 in response to a received call or for some other reason, to the BTS, 3) allocation of a stand alone dedicated control channel (SDCCH) to the connection. The actual signalling between the base station and the MS 1 takes place on the SDCCH. If the signalling on the SDCCH is call set-up signalling, the connection is moved to a TCH.

In addition to a TCH determined for data or speech transmission between the BTS and the MS 1 or an SDCCH determined for signalling between the BTS and the MS, there is also a slow associated control channel (SACCH). The SACCH is primarily used for transmitting measurements carried out by the MS 1 during the connection from the mobile station to the BTS.

SDCCHs and SACCHs can be used in the GSM mobile system for transmitting short digital data messages or short messages between the MS 1 and a short message service centre SMSC 2 connected to the system. In the GSM system, short messages are data messages consisting of at most 160 bytes. A short message may be a mobile-terminating (MT) short message or a mobile-originating (MO) short message. By means of the short message service it is also possible to realize broadcasting which means the transmission of a message to all remote radio stations situated within the area of one or several cells.

If the MS 1 has a connection on a TCH, short messages are transmitted on an SACCH. Otherwise, short messages are transmitted on an SDCCH. The HLR and the VLR are used for routing short messages in the mobile network essentially in the same manner as for routing calls.

FIG. 2 illustrates an arrangement for delivering a data message, transmitted from an external source to a short message service centre, to the MS 1. Messages arriving from different sources are forwarded to the SMSC 2 by means of a gateway application GA 3. The GA application converts the received message into a short message form and transmits the short message to the SMSC 2 for transmission to the MS 1 over the signalling channels of the GSM network. The GA 3 may be an apparatus that is integrated with one or several short message service centres, that has its own separate network address and that adapts messages to the short message form for several short message service centres. The GA 3 may also be a unit that operates directly in connection with one short message service centre in the same network address. The gateway application will be hereinafter referred to as a separate apparatus that operates in connection with the SMSC 2 in its own network address, without restricting the invention to this alternative, however.

FIG. 3 shows part of the protocol architecture which is used for transmitting short messages according to the GSM specification. The arrangement according to the invention will be described by using messages or protocol data units SMS-SUBMIT and SMS-DELIVER of a short message transfer protocol (SM-TP) layer and messages or protocol data units RP-MT-DATA and RP-MO-DATA of a short message relay protocol (SM-RP) layer. The SM-TP is a protocol that is defined between the short message service centres and mobile stations. SMS-DELIVER is a data unit transmitted from the short message service centre to the mobile station and SMS-SUBMIT is a data unit correspondingly transmitted from the mobile station to the short message service centre. The SM-RP is a protocol layer that is used between mobile stations and the mobile switching centres of the GSM network. RP-MT-DATA is a data unit of the RP layer terminating at a mobile station and RP-MO-DATA message is correspondingly a data unit of the RP layer originating from a mobile station.

According to the GSM specification, the data essential for the reply path in a short message received by the MS 1 includes the reply path availability data (TP-Reply-Path parameter) and the address of the unit that transmitted the message to the SMSC (TP-Originating-Address) contained in the SMS-DELIVER data unit and the source address of the short message (RP-Originating-Address) contained in the RP-MT-DATA data unit of the SM-RP protocol. If the SMS-DELIVER data unit comprises the TP-Reply-Path parameter, the reply path is available, otherwise the reply path is not available. In the first embodiment of the invention, the address of the unit that transmitted the message to the SMSC (SMS-DELIVER:TP-Originating-Address) is the network address of the GA 3 that operates between the SMSC and the external network. The source address of the short message (RP-MT-DATA:RP-Originating-Address) is the network address of the SMSC 2.

When a subscriber answers to a short message by means of the reply path function and the reply path is available according to the parameter, a reply message is formed by providing the parameter indicating the use of the reply path (SMS-SUBMIT:TP-Reply-Path) and by using the address of the unit that transmitted the short message to the SMSC, i.e. in the first embodiment of the invention the network address of the GA 3, as the TP-level destination address of the reply message (SMS-SUBMIT:TP-Destination Address=SMS-DELIVER:TP-Originating-Address). Correspondingly, the source address of the short message, which in this case is the network address of the SMSC 2 that delivered the short message to the mobile station, is used as the RP-level destination address of the reply message (RP-MO-DATA:RP-Destination-Address=RP-MT-DATA:RP-Originating-Address). The reply message transmitted by the MS 1 is routed on the basis of the RP-level destination address to the SMSC 2 and from there to the GA 3 on the basis of the TP-protocol destination address. However, the GA 3 does not contain information required for routing the short message forward to the network address of the unit that transmitted the message to the GA, and therefore the delivery of the reply message fails.

FIG. 4 shows a record structure illustrating the arrangement according to the invention for routing short messages to the original source address. The GA 3 is provided with a database DB 4 where records related to the short messages are stored for a predetermined period. When the GA 3 forms a short message originating from an external source and terminating at an MS, it adds the record shown in FIG. 4 to the DB 4. The first field "daddr" of the record comprises the destination address of the short message formed in the GA, the address being the network address of the MS 1 in the present embodiment. The second field "scts" of the record comprises the parameter used for identifying the short message, and in the present embodiment it is the time stamp of the short message service centre. The third field "omaddr" of the record comprises the original source address of the message that in the present embodiment is the address of the unit that transmitted the message from an external network to the GA.

In the arrangement according to the invention, the address of the unit that delivered the short message terminating at the MS 1 to the SMSC (SMS-DELIVER:TP-Originating-Address), called hereinafter a temporary source address, is formed by supplementing the network address (gaddr) of the GA 3 with a service centre time stamp (scts). As the subscriber answers to the short message, the aforementioned temporary source address is set as the TP-level destination address (SMS-SUBMIT:TP-Destination-Address) according to the determination of the reply path. The reply message is routed in the network to the GA 3 on the basis of the beginning of the destination address of the reply message (gaddr). The GA uses the time stamp (scts) provided in the destination address field of the reply message and the network address (daddr) of the MS 1 given as the source address for the reply message to form an index on the basis of which it carries out a search in the DB 4. As a result of the search through the database, the original source address (omaddr) of the message is obtained and it is given as the new destination address of the reply message, and the message is forwarded.

In the above-described example, the identification of the reply message employs the service centre time stamp that is easily available in the GA 3. By means of the time stamp a short message can be typically identified with the accuracy of one second, and therefore in order to unequivocally identify a reply message in the GA, the search through the database is carried out on the basis of the time stamp and the destination address of the short message. In the present case, the identifier unequivocally identifying the reply message consists of a combination of the time stamp and the destination address of the short message. The factor essential for the invention in the selection of the identifier is that the identifier identifies the reply message unequivocally in the originating element. In other respects, the identifier can be selected separately for each application.

The reply path is specific for each message according to the GSM specification. A record related to the short message is created during the formation of the short message and the data is stored in the GA for a predetermined time. The period of storage is preferably the validity period determined in the GSM specification for a short message, but the time of storage in the database can be selected specifically for each application.

Figure 5:
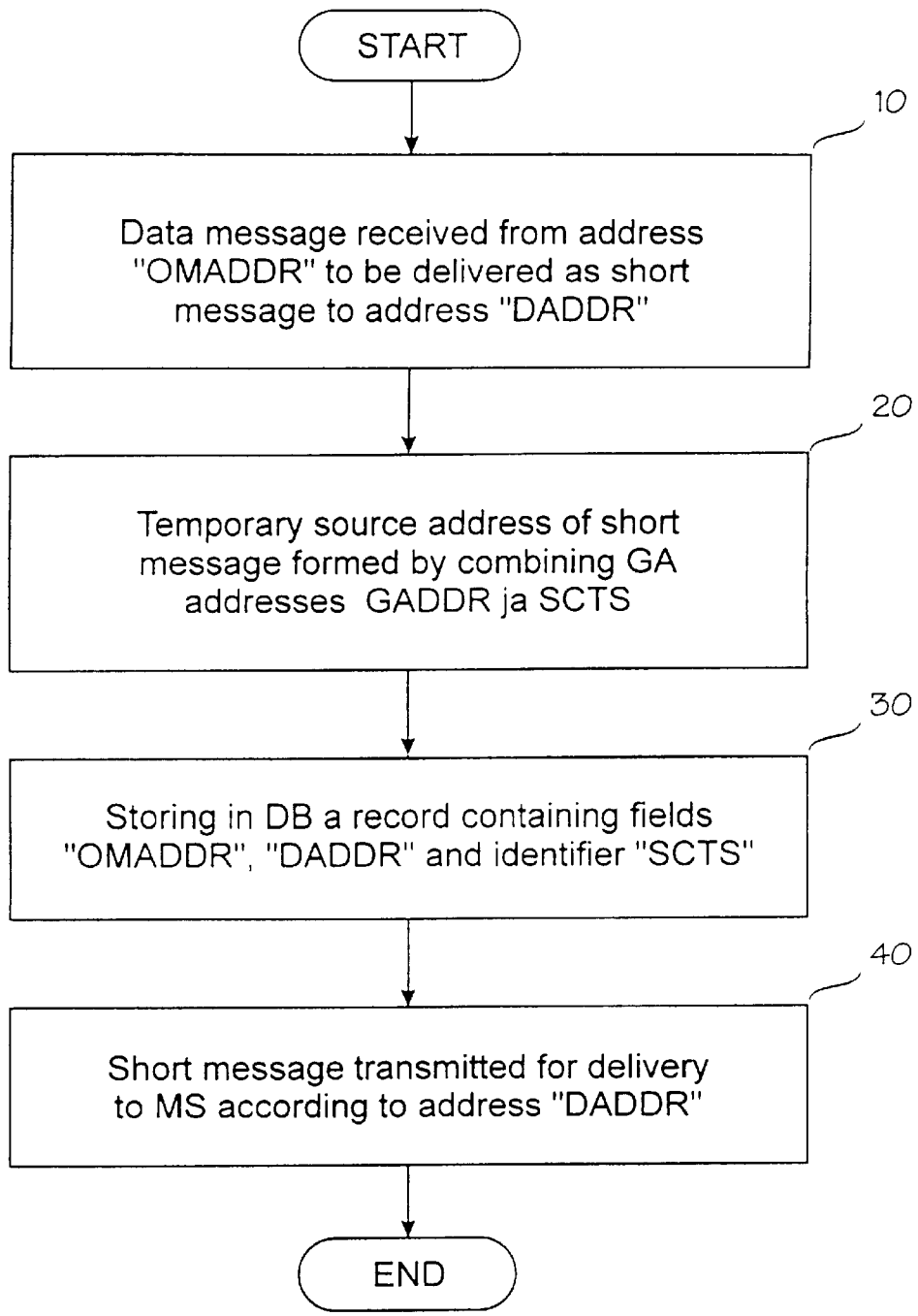

FIG. 5 is a flow chart illustrating the operation of a gateway application connected to an SMSC in connection with the transmission of a mobile-terminating short message. In step 10, gateway application equipment connected with one or several SMSCs receives from the address "omaddr" a data message to be forwarded to the MS 1 to the address "daddr" in the form of a short message. A short message is formed in the gateway application apparatus (step 20), and the source address of the message is formed by supplementing the GA address "gaddr" with the parameter "scts" used in the identification of the short message. In the present example, the formation of the identifier employs a time stamp "scts" that is used in the transmission of short messages and that distinguishes the short messages within an accuracy of one second. The gateway application comprises a database 4 where a record comprising the fields "omaddr", "daddr" and "scts" is created (step 30). The field "omaddr" comprises the address data of the unit that delivered the data message to the gateway application. The field "daddr" comprises for example the address of the mobile station that may be the MSISDN number of the MS, for instance. The field "scts" comprises the aforementioned service centre time stamp. The fields "daddr" and "scts" form together the identifier that unequivocally identifies each short message formed by the GA. In step 40, the short message is provided to the SMSC to be forwarded to the MS to the destination address "daddr".

FIG. 6 shows a flow chart illustrating the operation of a GA connected to an SMSC in connection with the transmission of a mobile originating short message. In step 50, the GA receives a reply short message from the mobile station from the address "daddr", the destination address of the message consisting of the temporary source address of the short message "gaddr"+"scts". The GA combines the time stamp "scts" and the address of the mobile station "daddr" into a search index (step 60) on the basis of which it retrieves from the DB 4 the original source address of the message "omaddr" (step 70). The GA forms from the short message a message to be transmitted to the original source address and transmits it to the address "omaddr".

The drawings and the related description are only intended to illustrate the inventive idea. The details of the method and the system according to the invention may vary within the scope of the claims. Even though the invention is described above in connection with the GSM system, the arrangement according to the invention is also applicable for use in all radio systems utilizing a similar message service.

What is claimed is:

1. A method for routing a short message via a short message gateway application in a digital mobile system, the method comprising the steps of receiving, in a short message gateway application, a data message containing the original source address and destination address, converting the data message into a short message, transmitting the short message to a mobile station determined in the destination address via the mobile system, forming an identifier identifying the short message, forming a temporary source address of the short message by combining the address of the gateway application and the identifier identifying the short message or a part of if, storing, in the gateway application, the routing data of the short message containing the original source address of the data message and said identifier identifying the short message, receiving from the mobile station a reply short message containing said identifier identifying the short message, retrieving from the routing data the original source address on the basis of said identifier identifying the short message, transmitting a reply message to said original source address.

2. A method according to claim 1, wherein the identifier identifying the short message comprises a service centre time stamp.

3. A digital mobile system comprising terminal equipments signalling with the system on predetermined signalling channels, at least one short message service centre with which the terminal equipments can exchange short messages, and at least one short message gateway application connected to at least one short message service centre for converting the data messages arriving at the short message service centre into the short message form, wherein the gateway application being arranged to form the temporary source address of the short message by combining the identifier identifying the short message or a part of it to the address of the gateway application, the gateway application being arranged to store the routing data of the short message, the routing data comprising the original source address of the message and the identifier identifying the short message, in response to the reception of the reply message, the gateway application being arranged to retrieve from the routing data the original source address of the message by means of the identifier used for identifying the short message, the gateway application being arranged to transmit the reply message to said original source address of the message.

4. A system according to claim 3, wherein the identifier identifying the short message comprises the service centre time stamp.

\* \* \* \* \*